T. N. Hill.

BEST AVAILABLE COPY

Making Combs.

BEST AVAILABLE COPY

No. 8,144. Patented June 10, 1851.

A.M. PHOTO-LITHO. CO. N.Y. (SCHERR'S PROCESS)

BEST AVAILABLE COPY

UNITED STATES PATENT OFFICE.

THOS. W. HILL, OF LEOMINSTER, MASSACHUSETTS.

COMB-CUTTING MACHINE.

Specification of Letters Patent No. 8,144, dated June 10, 1851.

*To all whom it may concern:*

Be it known that I, THOMAS W. HILL, of Leominster, in the county of Worcester and State of Massachusetts, have invented a new and useful Improvement in Machinery for Cutting Combs from Horn, Tortoise-Shell, or other Suitable Sheet Material; and I do hereby declare that the same is fully described and represented in the following specification and accompanying drawings, letters, figures, and references thereof.

Figure 4:
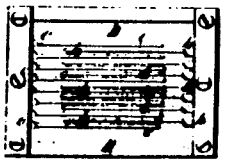
Figure 2:
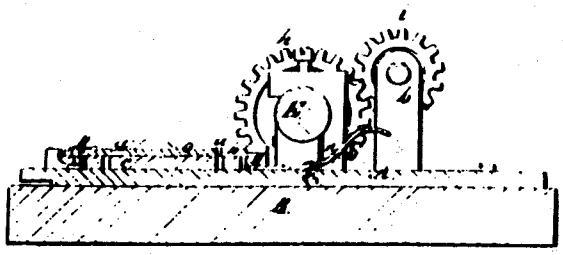
Figure 3:
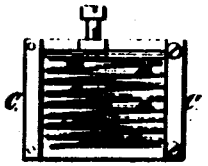
Figure 1:
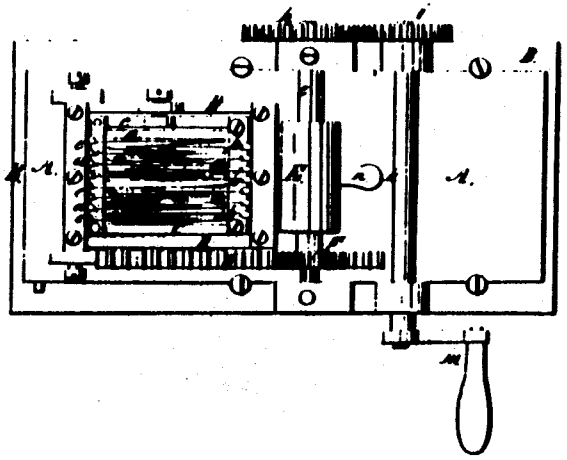

Of the said drawings, Figure 1, denotes a top view of my improved comb cutting machine. Fig. 2, is a vertical, central, and longitudinal section of it. Fig. 3, is a top view of the frame of interlocking cutters or dies. Fig. 4, is a top view of the two series of interlocking clearers or lifters, and their frame to be hereinafter described.

In the said drawings A, represents a bed, resting upon a platform B, and having a rectangular frame or chase C, fixed firmly upon its upper surface. Within the frame or chase C, a series of cutters or knives is set up, or arranged, as seen at *a*, *a*, &c., in Fig. 3, and are secured in place in any proper manner. These cutters are disposed in such way that when a sheet of horn, tortoise sheel, or other proper material, is laid on their cutting edges, which are all brought to a level, and such sheet is pressed down upon the cutters, they will enter, or pass through the sheet, and separate it into two combs, the teeth of one of which will interlock with those of the other, and may or may not be "bottomed" at the same time (that is to say when they are cut,) as occasion may require. Surrounding and somewhat raised above the chase or frame C, is another rectangular frame D, which has a series of bars *b*, *b*, *b*, &c, or *c*, *c*, *c*, &c., extending horizontally and inward from each of its ends, as seen in Fig. 4. The bars or lifters of one series, interlock with those of the other series, and each bar is made to pass between some two of the cutters, by which a tooth of one of the combs is made, and the upper edges of all the said bars when the frame D, is down to its lowest position, should be below the top edges of the cutters, a distance equal to or a little greater than the thickness of the sheet of material from which the combs are to be struck; and this in order to permit the cutters to freely pass through the sheet, when it is pressed down by the pressure roller E, arranged over or above the cutters, as seen in the drawings. One series of levers *b*, *b*, *b*, &c, carries one comb out of the dies or cutters while the other series *c*, *c*, *c*, &c, elevates the other comb out of the same.

On the shaft *e*, of the roller E, there is a gear F, which plays or works into a rack *g*, fixed on the upper surface of the bed A, the said bed being so applied to the platform, as to be capable of being easily moved in a straight direction, either backward, or forward, and underneath the pressure roller E. On the other end of the shaft *e*, there is another gear *h*, which works into a third gear *i*, fixed on a horizontal shaft *k*, the said two shafts *e*, and *k*, being supported in suitable bearings, or standards, elevated on and above the platform B. A crank *m*, is attached to the shaft *k*, as seen in Fig. 1. The frame D, is hinged or so jointed at one end of it to the bed A, as to be capable of being turned upward as shown by dotted lines in Fig. 2. One arm of a bent lever *n*, extends underneath the other end of the frame D, the said lever being made to rock in a vertical plane, and on a fulcrum *o*, fixed to the bed A, in the position as seen in Fig. 2. The other arm of the said lever is so bent upward, that after the operation of pressing the sheet material down upon the cutters or dies has been performed, it, (the said arm) may be carried in contact (by the movement of the bed,) with the roller, and a downward pressure produced upon it, sufficient to depress it, and thereby elevate its other arm, and of course the frame D, in such manner as to cause the lifting bars to raise the comb out of the dies.

In operating with the machine, the plate or sheet of horn is first laid upon the cutters, and while the lifters are down to their lowest positions between them. The workman next applies his hand to the crank *m*, and puts it in motion in such a way, as to cause the sheet material and the cutters, to pass underneath the pressure roller E, and thereby force the cutters through the sheet. Immediately on completion of the cutting operation, the further movement of the bed A, carries the elevated arm, of the bent lever *n*, against the roller E, in such manner as to depress the said arm, and produce the elevation of the lifter bars, and frame, in the manner, and for the purpose, as herein before specified.

I do not claim the mere use in a die of a clearer for forcing out of the die the article produced thereby, but What I do claim as my invention, is—

The combination of the two series of lifters and bent lever $n$, (arranged upon the traveling carriage A), with the pressure roller, in such manner that the continued motion of the carriage shall operate the lifters after the combs are cut substantially as herein before described.

In testimony whereof, I have hereto set my signature, this twelfth day of February A. D. 1851.

THOMAS W. HILL.

Witnesses:
JOEL C. ALLEN,
JOEL W. FLETCHER.